United States Patent [19]

Pollack et al.

[11] 3,946,331
[45] Mar. 23, 1976

[54] NERNST LAMP FOR LASER PUMPING

[75] Inventors: Slava A. Pollack, Palos Verdes Estates, Calif.; Van O. Nicolai, Reston, Va.

[73] Assignee: The United States of America as represented by the Secretary of the Navy, Washington, D.C.

[22] Filed: Apr. 30, 1974

[21] Appl. No.: 465,464

[52] U.S. Cl. .............................. 331/94.5 P; 330/4.3
[51] Int. Cl.² ........................................ H01S 3/091
[58] Field of Search ........ 331/94.5; 315/116; 313/9, 313/14; 330/4.3

[56] References Cited
UNITED STATES PATENTS

| 685,725 | 10/1901 | Nernst | 313/14 |
|---|---|---|---|
| 1,385,608 | 7/1921 | Darrah | 313/9 |
| 3,206,631 | 9/1965 | Kauer et al. | 313/14 |
| 3,614,663 | 10/1971 | Palanos | 331/94.5 P |

*Primary Examiner*—William L. Sikes
*Attorney, Agent, or Firm*—R. S. Sciascia; R. Beers; P. Schneider

[57] ABSTRACT

A Nernst lamp is used as the pumping means for a solid state laser. The lamp materials are selected so that the light energy emitted is essentially concentrated in the relatively narrow pump region of the absorption spectrum of the laser crystal. The input power in to the laser is equivalent to that of much higher power lamps operating over a much wider spectrum.

8 Claims, 3 Drawing Figures

NERNST LAMP FOR LASER PUMPING

BACKGROUND OF THE INVENTION

The present invention relates generally, to an improved method of and apparatus for pumping a laser and, more specifically, to the novel use of a Nernst lamp to pump a solid state laser.

At the present time tungsten-iodine incandescent lamps are the most popular choice for pumping medium power solid state cw lasers. The spectral distribution of radiant energy of a tungsten-iodine lamp is essentially a scaled down black body distribution. Consequently, only a small fraction of the input power appears as emitted energy in the region of the absorption spectrum of a laser material, most of the energy being emitted in the infrared. Another problem associated with tungsten lamps, which lower the overall efficiency of a laser system is an unstatisfactory optical coupling between the lamp and the laser due to a poor geometrical configuration formed by the lamp with the laser rod in an optical cavity.

In general, in order to improve the luminous efficiency, or fraction of energy emitted in the visible by an incandescent source, one can: (1) operate the source at a higher temperature, or (2) make the light emitting elements from a material with characteristics which deviate from those of a black body and which emit radiation selectively in the pump region of the spectrum. The first approach is unacceptable since it leads to a drastically shortened lamp life. The second approach, which until now has been overlooked in the laser pump application, is the subject matter of the present invention and involves the use of selective thermal radiators, commonly called Nernst lamps.

Selective thermal radiators are ceramics which are made of mixtures of metallic oxides with low and high thermal emissivities in the visible region. By nature they are conductors whose electrical conductivity is a negative function of temperature. When heated to incandescence, selective radiators reach a higher temperature than a black body heated with the same input power because they emit radiation discretely in the selected region of the spectrum. By a proper choice of mixture composition it is possible to concentrate emission in the region of primary absorption of a laser material. Selective thermal radiators outperform a black body radiator since they reach a higher temperature than the black body for a given amount of power supplied, and will radiate a larger fraction of energy in the visible. The mixture is desirable in order to obtain higher temperature. The low emissivity material will reach a high temperature when power is supplied to it, but because of its low emissivity throughout the visible spectrum little visible radiation results. A material having a high radiant emittance in the visible and a low emittance elsewhere will radiate more in the visible but will not reach as high as temperature for a given amount of power supplied. By mixing a small amount of the two materials, the amount of visible power radiated can be maximized; the material will reach a high temperature and will also radiate in the visible.

SUMMARY OF THE INVENTION

An object of the invention is to provide an improved laser pump which concentrates its emission of energy in the narrow absorption spectrum of the laser material.

This object is accomplished in the present invention by an improved construction of a solid state laser which permits pumping of the laser by a Nernst glower.

The glower or lamp is made of a ceramic conductor which does not require a glass envelope for operation and can be constructed in any convenient configuration. In a specific application, the glow is constructed in a cylindrical configuration and the laser rod is placed along its geometrical axis. As a result, the optical coupling couping between the glower and the laser is significantly improved. This hollow cylinder may be formed of a single piece of ceramic or from a plurality of ceramic rods connected together at their ends. The ceramic cylinder or rods are doped with several rare earth elements which emit energy in a relatively narrow spectrum. A $LiYF_4$ (YLF) laser crystal is also doped with the same rare earth elements so that it absorbs energy of the same wavelength as that emitted by the lamp. The energy emitted by the lamp is essentially concentrated in the pump region of the laser crystal so that an efficient use of pumping energy is maintained.

BRIEF DESCRIPTION OF THE DRAWINGS

Other objects, advantages and novel features of the present invention will become apparent from the following detailed description of the invention when considered in conjunction with the accompanying drawing, in which.

DETAILED DESCRIPTION OF THE INVENTION

Figure 1:
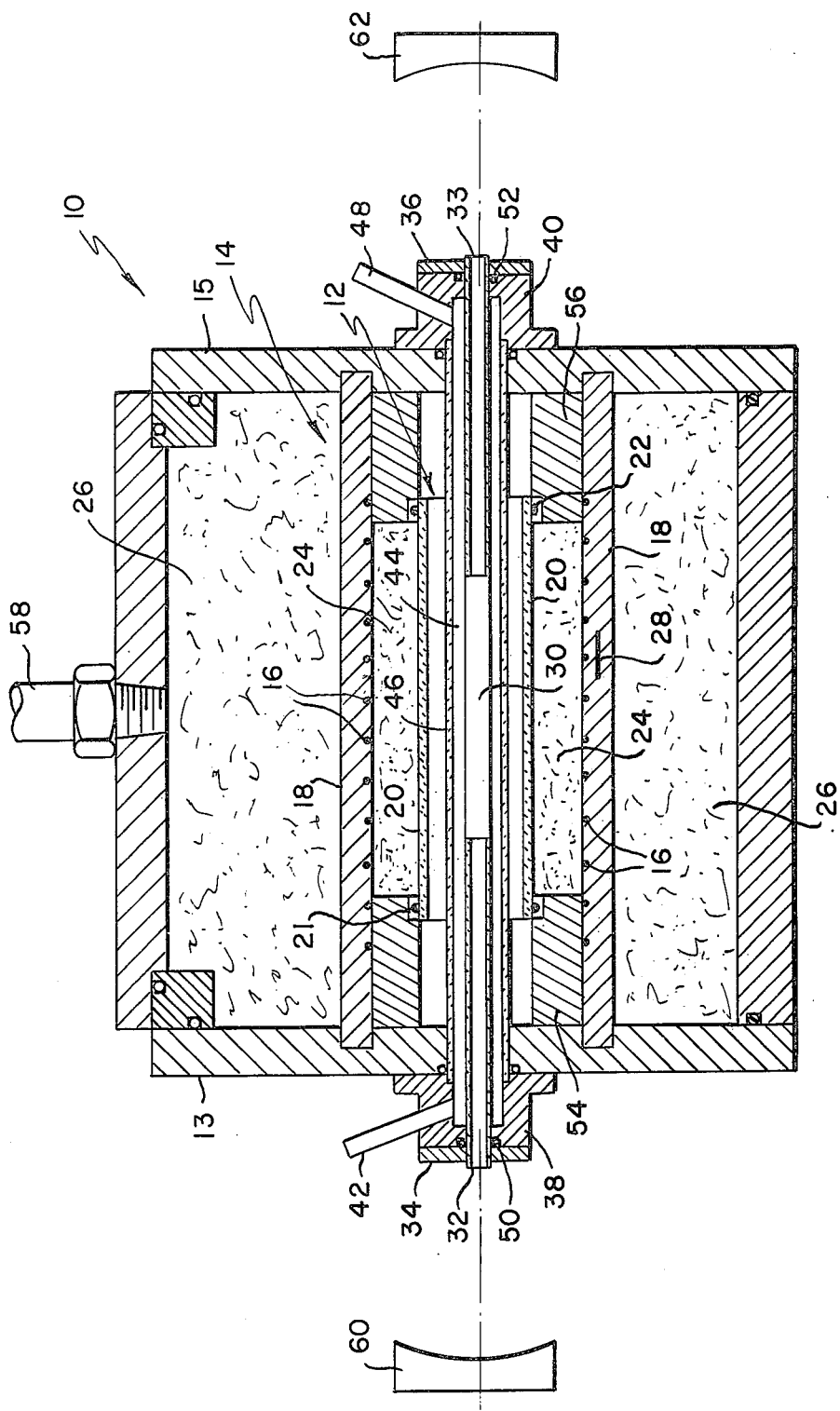
FIG. 1 is a cross-sectional view of a laser pump housing incorporating the present invention.

FIG. 1 shows an anodized aluminum laser pump housing 10 having an internal Nernst glower assembly 12 mounted inside of a preheater assembly 14. Assembly 14 is supported by end plates 13 and 15 of housing 10. The preheater 14 includes a Kanthal A winding 16 wound on as alumina support tube 18. The heater winding 16 is cemented to the alumina core with Norton RA 1139 Cement. The Nernst glower assembly 12 is made up of a cylindrical configuration of 55 1 m diameter zirconia based ($Z_r\,O_2-Y_2O_3$) rods 20, doped with several selected rare earth oxides, such as erbia ($Er_2O_3$) thulia $Tm_2O_3$ ytterbia $Yb_2O_3$ or a combination of the three. By way of example, a sepcific dopant concentration used was 0.3 percent erbia, 0.3 percent ytterbia, and 0.3 percent thulia for a total concentration of approximately one percent. The length of rods used in the embodiment was 2.740 inches.

Figure 2:
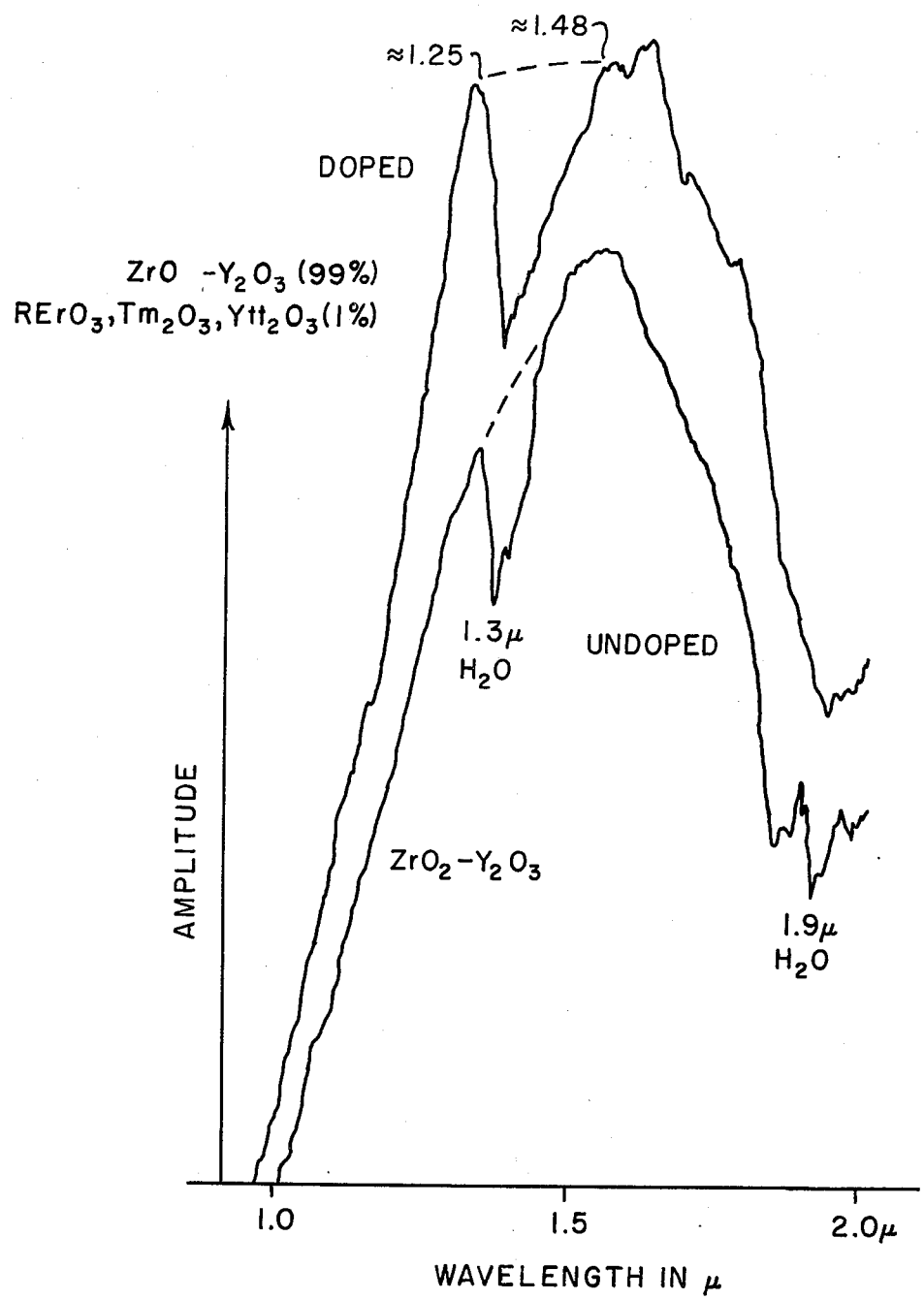
FIG. 2 is a graphical representation of the relative emissivity of a $Zr\,O_2-Y_2O_3$ lamp rod constructed in accordance with the present invention.
Figure 3:
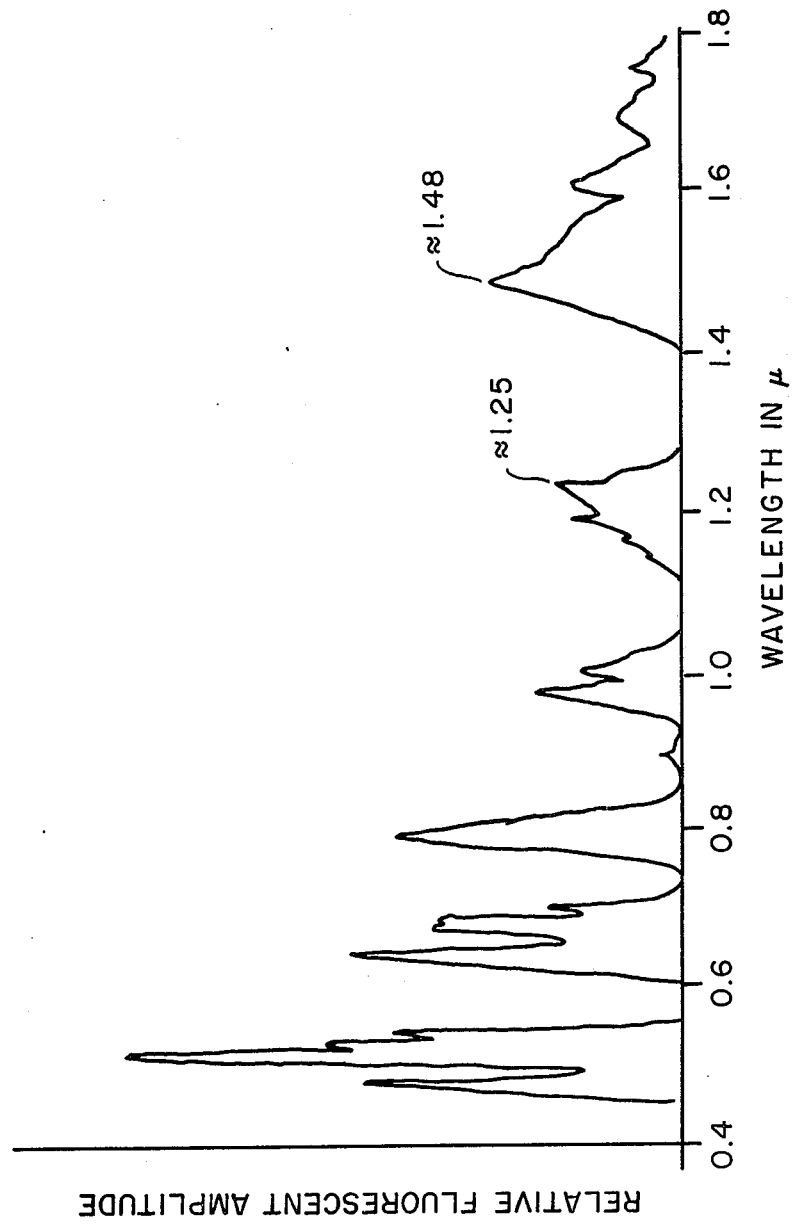
FIG. 3 is a graphical representation of the absorption spectrum of the alphabet YLF Laser, constructed according to one embodiment of the invention.

The laser for which the lamp is intended is $LiYF_4$ doped with Ho and the same rare earth elements as the rods used in the glower assembly i.e., Er, Tm and Yb. For convenience the doped lasers are called alphabet YLF and it is conventionally used in designators and range finders. The lasing ion is $Ho^{3+}$ emitting radiation at 2.066 microns. Energy absorbed by Er, Tm and Yb is transferred to the $Ho^{3+}$ion, thus incorporation of the former rare earths into the laser host material increases the number of pump bands and consequently improves laser efficiency. The best relative emissivity for the rods and dopant concentration given was found in the region between 1 and 2 microns which corresponds to a principal absorption band of the alphabet YLF laser, as can be seen by a comparison of the amplitude peaks in FIGS. 2 and 3. A considerable enhancement of emission of the doped rod in the 1.4 and 1.6 micron range can be seen in FIG. 2 from a comparison of the curves for a doped rod and a rod containing no rare earth oxides. These regions correspond to the absorption bands of $Tm^{3+}$ and $Er^{3+}$ ions. As an alternative to the zirconia ($ZrO_2$) based rods thoria ($ThO_2$) and thoria-urania ($ThO_2$—$UO_2$) based rods could be used. The spectral emissivity of $ZrO_2$ in the infrared region is similar to $ThO_2$, although $ZrO_2$ is transparent (i.e. does not absorb or radiate energy) up to about 7–8 microns where it starts strongly absorbing and emitting radiation. $ZrO_2$ is superior to $ThO_2$ from the point of view of electrical conductivity and inferior in melting temperature (2700° vs 3200°C).

As an alternative to the cylindrical configuration of rods 20 a solid cylinder formed of the same ceramic and dopant materials could be used.

Returning to FIG. 1, current carrying leads 21 and 22 to the glower assembly 12 are made of 7 strands of 0.004 inch diameter platinum wire, which may be twisted and wrapped over the ends of the tube 20 and subsequently cemented thereto by a binder consisting of a mixture of oxide powders and zirconium chloride. The glower assembly 12 is supported Zicar felt 24 made by Union Carbide Material System Division, while the space 26 between the preheater 14 and the alumina housing 10 is also filled with Zicar felt. A platinum/ platinum-rhodium thermocouple 28 is mounted inside the preheater core 18 so that it is near but not touching the glower rods 20.

A YLF laser crystal 30 is mounted on quartz support tubes 32 and 33 which, in turn, are supported by "O" rings 50 and 52 secured to coolant entrance/exit flanges 38 and 40 respectively. Coolant, such as water, enters the housing 10 through a ¼-inch diameter aluminum tube 42 on entrance flange 38, flows in space 44 between the laser crystal 30 and the inner diameter of a 0.240 inch i.d., 0.340 inch o.d. quartz coolant tube 46 and exits in a like manner from a ¼-inch diameter aluminum tube 48 connected to the exit flange 40. O ring seals 34 and 36 are used to seal the O rings 50 and 52 to the entrance and exit flanges 38 and 40, while low density alumina spacers 54 and 56 provide spacing between the felt 24 and end plates 13 and 15 of housing 10. A pressure/vacuum guage 58 is also shown to permit operation of a glower assembly in any atmosphere or vacuum, although certain assemblies require air atmosphere and in these cases the guage 58 would not be included. Mirrors 60 and 62 are conventional reflective-transmissive surfaces which promote laser oscillation and transmit an output from the laser.

Turning to the operation of the laser, preheater 14 is energized and heats the glower assembly 12. After reaching a sufficient temperature, the electrons in the glower assembly 12 become unstable. The unstable electrons travel along the glower rods 20 in a direction established by a potential difference between leads 21 and 22, thus creating a current within the rods 20 which initiates conduction of the glower. The current within the rods 20 also heats the glower assembly 12 and after a predetermined temperature is reached, it is sensed by thermocouple 28 which de-energizes preheater 14 so that the glower assembly becomes self-heating. The temperature of the glower continues to rise until the glower becomes white and emits energy in the form of light. The light energy is transmitted through quartz coolant tube 46 and impinges on the YLF laser crystal 30. Since the wavelength of the light energy emitted by glower assembly 12 corresponds to the energy absorption region of the crystal 30, the light pumps the laser crystal and initiates lasing action in the crystal. The output from the laser crystal 30 is transmitted by quartz support rods 32 and 33 to mirrors 60 and 62 respectively. The mirrors partially reflect the output from the crystal to create oscillation and partially transmit an output from the laser.

Thus there has been described a novel means for pumping a laser by a light which concentrates its emitted energy essentially in the absorption region of the laser crystal. A specific embodiment has been disclosed in which the invention may be utilized and the beneficial features and advantages can be seen from the disclosure.

Obviously, many modifications and variations of the present invention are possible in light of the above teachings. It is therefore to be understood that, within the scope of the appended claims, the invention may be practiced otherwise than as specifically described.

What is claimed is:

1. A laser apparatus comprising:
   laser means with a lasing medium adapted to absorb energy of a specific frequency range; and
   pumping means with a radiating source formed from an electrically conductive ceramic doped with specially chosen oxides so that a selective thermal radiator is formed with emissivity properties approximately matching the spectral absorption properties of said lasing means, said pumping means being suitably positioned adjacent said lasing medium so that the energy from said pump means may be radiated thereon.

2. The improvement described in claim 1 wherein said lasing medium comprises an $LiYF_4$ crystal material doped with Ho, Er, Tm, and Yb and has its spectral absorption characteristic concentrated between 1 and 2 microns.

3. The improvement of claim 1 wherein said selective thermal radiator consists of cylindrically shaped ceramic conductor.

4. The improvement described in claim 3 wherein said ceramic conductor is doped with at least one rare earth oxide.

5. The improvement described in claim 1 wherein said selective thermal radiator consists of a cylindrical zirconia based conductor.

6. The improvement described in claim 1 wherein said selective thermal radiator consist of a cylindrical thoria based conductor.

7. The apparatus of claim 6 wherein said laser further includes a cooling means to prevent said lasing means from overheating.

8. A laser apparatus comprising:
   solid state lasing means with a lasing medium adapted to absorb energy of a specific frequency range; and
   pumping source means comprising a selective thermal radiator for radiating energy which is essentially concentrated in the absorption region of said lasing means, said pumping source means being suitably positioned adjacent to the lasing medium of said solid state lasing means so that said pumping source means radiates its energy thereon.

\* \* \* \* \*